US008214686B2

(12) United States Patent
Ueda

(10) Patent No.: US 8,214,686 B2
(45) Date of Patent: Jul. 3, 2012

(54) DISTRIBUTED PROCESSING METHOD

(75) Inventor: Haruyasu Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 203 days.

(21) Appl. No.: 12/119,719

(22) Filed: May 13, 2008

(65) Prior Publication Data

US 2008/0294937 A1    Nov. 27, 2008

(30) Foreign Application Priority Data

May 25, 2007   (JP) ................................. 2007-139384

(51) Int. Cl.
*G06F 11/00* (2006.01)
(52) U.S. Cl. .......................................... 714/15; 718/101
(58) Field of Classification Search ..................... 714/15; 718/101

See application file for complete search history.

(56) References Cited

U.S. PATENT DOCUMENTS

| | | | | |
|---|---|---|---|---|
| 5,712,971 | A * | 1/1998 | Stanfill et al. .................. | 714/34 |
| 5,796,941 | A * | 8/1998 | Lita ............................... | 726/29 |
| 5,872,970 | A * | 2/1999 | Pickett et al. ................. | 718/101 |
| 5,958,071 | A * | 9/1999 | Iida et al. ...................... | 714/17 |
| 7,213,246 | B1 * | 5/2007 | van Rietschote et al. ......... | 718/1 |
| 7,516,360 | B2 * | 4/2009 | Bacher et al. .................. | 714/12 |
| 7,536,591 | B2 * | 5/2009 | Varadarajan et al. ............ | 714/15 |
| 2002/0129297 | A1 * | 9/2002 | Takeda ........................... | 714/15 |
| 2004/0172574 | A1 * | 9/2004 | Wing et al. ..................... | 714/4 |
| 2004/0193827 | A1 * | 9/2004 | Mogi et al. ..................... | 711/170 |
| 2005/0060608 | A1 * | 3/2005 | Marchand ........................ | 714/18 |
| 2005/0289385 | A1 * | 12/2005 | Nakaya ........................... | 714/5 |
| 2008/0256167 | A1 * | 10/2008 | Branson et al. ................. | 709/201 |

FOREIGN PATENT DOCUMENTS

| | | |
|---|---|---|
| JP | 07-168794 | 7/1995 |
| JP | 09-212467 | 8/1997 |
| JP | 2003-288318 | 10/2003 |
| JP | A 2004-334493 | 11/2004 |
| JP | 2006-127000 | 5/2006 |
| JP | A 2006-260281 | 9/2006 |

OTHER PUBLICATIONS

Notification of Reason For Refusal dated Mar. 27, 2012 in corresponding Japanese Patent Application No. 2007-139384 (partial English translation).

* cited by examiner

*Primary Examiner* — Charles Ehne
(74) *Attorney, Agent, or Firm* — Greer, Burns & Crain, Ltd.

(57) ABSTRACT

According to an aspect of the embodiment provides a method for controlling a processing device for distributing jobs among a plurality of job processing devices for executing the jobs, respectively. The method comprises the steps of: transmitting a job to one of the job processing devices to have the job executed by the one of the job processing devices; generating a procedure information for transmitting a continuation data from the one of the job processing devices before completion of execution of the job back to the processing device, the continuation data enabling another job processing device to continue execution of the job; and transmitting the procedure information to and receiving the continuation data from the one of the job processing devices.

5 Claims, 11 Drawing Sheets

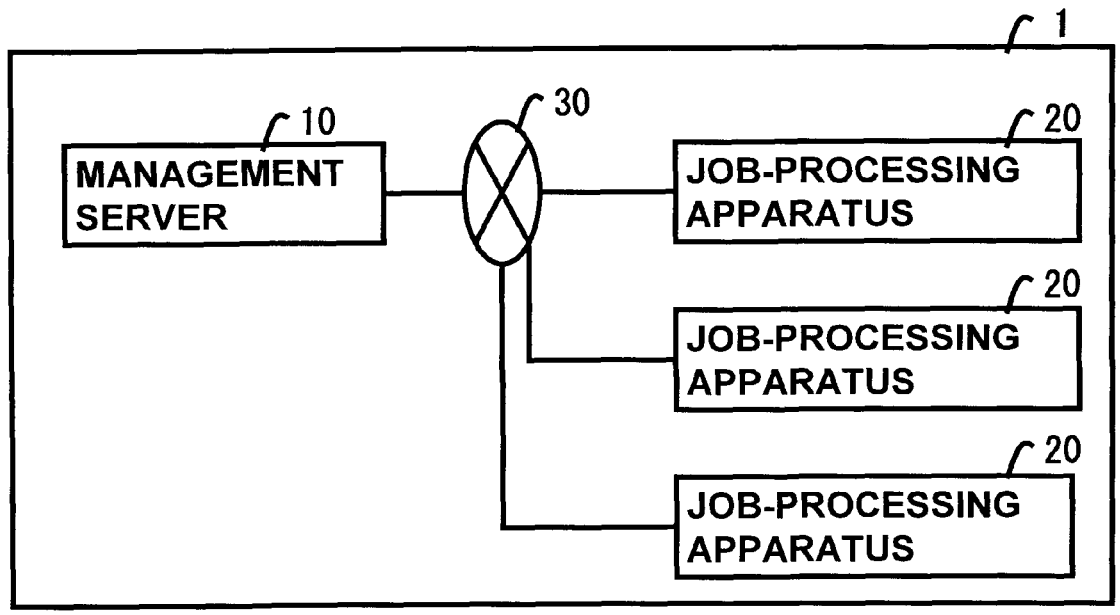
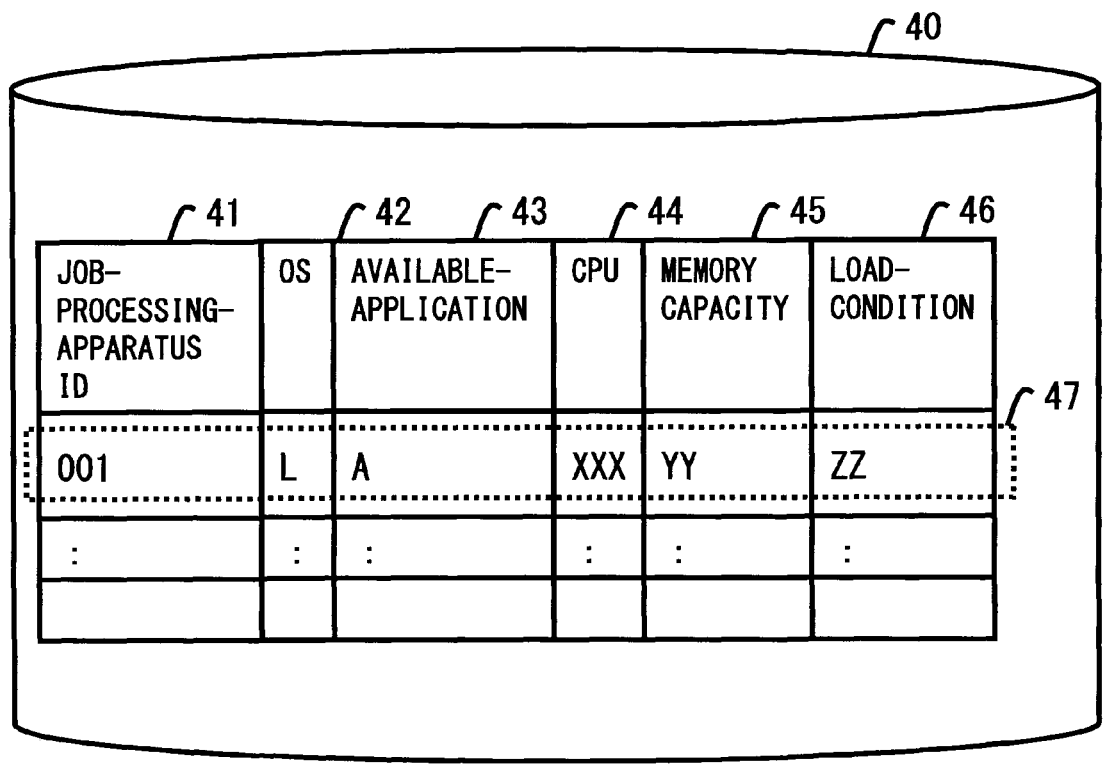

```
1:  top {{
2:    do_job {{ JOB NAME }} {{
3:      attribute {{
4:        required_file. begin= Description Of Group Of Files Transferred Before Start Of Execution Of Job Processing
5:        required_file. end  = Description Of Group Of Files Transferred After Execution Of Job Processing
6:      }}
7:      Description Of Job Description To Be Executed
8:    }}
9:    do_job . . . .
10:   do_job . . . .
11:   . . .
12: }}
```

17

DISTRIBUTED PROCESSING METHOD

TECHNICAL FIELD

1. Field of the Invention

The present invention relates to a technique of enabling the recovery of a job of a distributed processing system.

2. Description of the Related Art

A distributed processing system constituted by a plurality of computer resources located on a network includes a computer cluster, grid computing, and so forth. In a distributed processing system, a program to be processed is divided into units of processing (hereinafter referred to as the jobs), and each of the computer resources executes the processing for each of the jobs. In the distributed processing system, a system-down occurs in some cases due to a failure of the computer resources and the maintenance of the computer system. Therefore, the state during the execution of the processing is stored (checkpointed) periodically or at appropriate timing to enable the use of the result of job processing executed until the system-down. Thus, upon recovery of the computer system, the execution of the job processing can be restarted from the time of checkpointing. The method of restarting the execution of the job processing from the checkpoint in the distributed processing system includes the following methods.

The first method provides the system with a function of storing in a storage device the state during the execution of the program to be processed. However, in a method of performing checkpoint restart by using a homemade program, the program creator needs to be able to obtain a source program for the job and to fully understand which data of the source program should be stored. Therefore, the first method increases the burden on a program creator and lacks versatility.

The second method uses a library for restarting the execution of the program to be processed from the checkpoint. If there is a checkpointed file, the execution of the job can be automatically restarted from the state in the re-execution of the job. In the checkpointing performed by a batch system, however, the checkpoint cannot be created in an Operating System (OS), if the implementation of the OS is not disclosed. Further, the second method requires the recompilation of a binary file, and cannot perform the checkpointing if the source program is unavailable.

A technique related to the above techniques is disclosed Japanese Laid-open Patent Publication Nos. 2004-334493 and 2006-260281.

SUMMARY

According to an aspect of the embodiment provides a method for controlling a processing device for distributing jobs among a plurality of job processing devices for executing the jobs, respectively. The method comprises the steps of: transmitting a job to one of the job processing devices to have the job executed by the one of the job processing devices; generating a procedure information for transmitting a continuation data from the one of the job processing devices before completion of execution of the job back to the processing device, the continuation data enabling another job processing device to continue execution of the job; and transmitting the procedure information to and receiving the continuation data from the one of the job processing devices.

BRIEF DESCRIPTION OF THE DRAWINGS

FIG. 1 is a system configuration diagram of a batch system in an embodiment of the present embodiment;

FIG. 3 is a configuration diagram of a job state management table in the present embodiment;

DESCRIPTION OF THE PREFERRED EMBODIMENT

Figure 2:
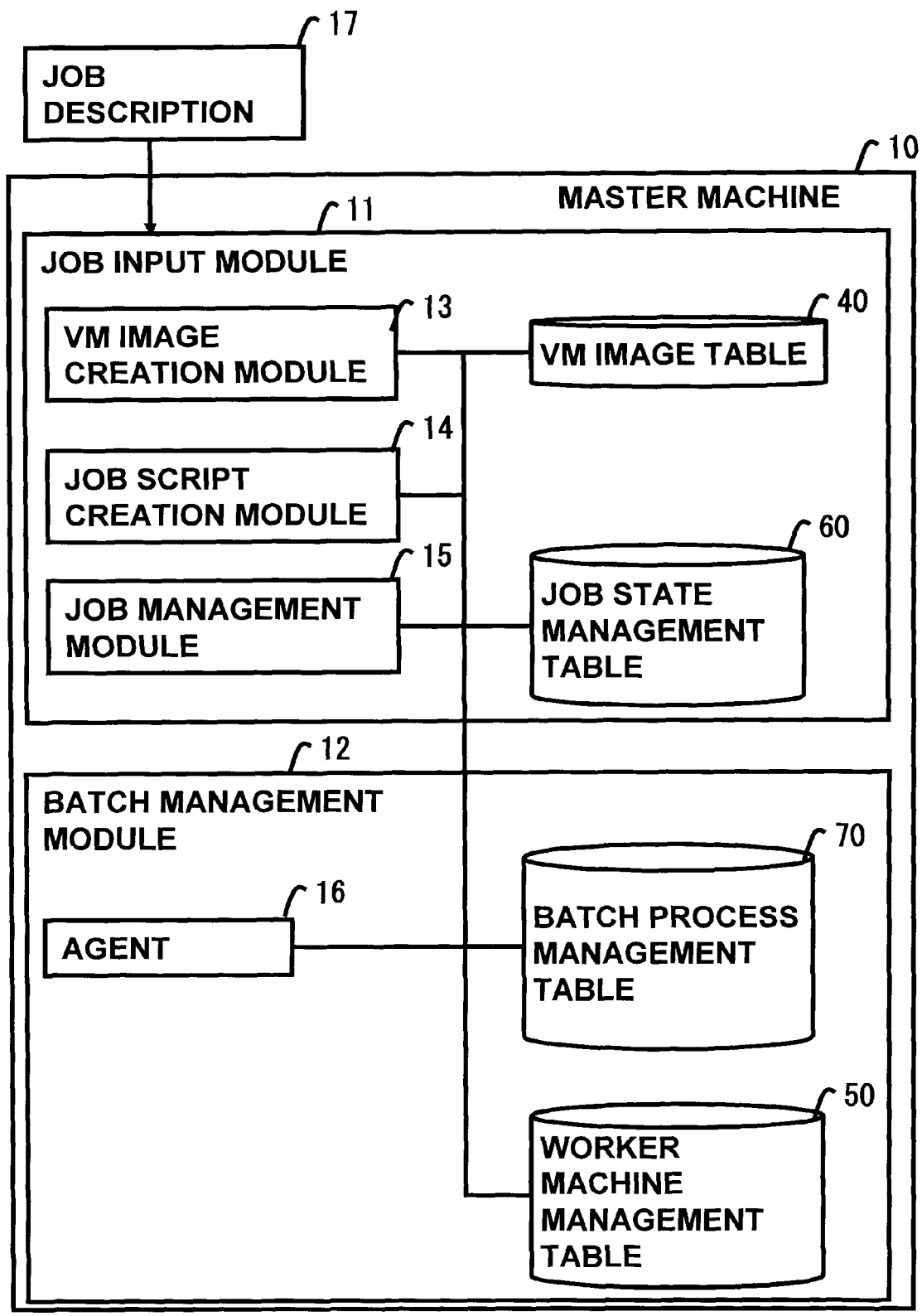
FIG. 2 is a functional block diagram of a master machine in the present embodiment.

According to a first aspect of an embodiment, a distributed processing device for acquiring a result of the execution of job processing executed in a job processing device performs the following steps. The distributed processing device creates first procedure information with which basic software included in the job processing device and operating on a virtual machine detects the job processing. Then, the distributed processing device creates second procedure information with which state information of the virtual machine capable of reproducing the state of the processing in the virtual machine at a given point in time is transmitted from the job processing device to the distributed processing device. Then, the distributed processing device transmits to a job management module of the job processing device a job script file including the first procedure information and the second procedure information. Then, the distributed processing device stores in a storage module thereof the state information transmitted from the job processing device.

According to a second aspect of an embodiment, in addition to the first solving means, the step of creating the second procedure information performed by the distributed processing device further creates a job script file including procedure information for executing a process of suspending the virtual machine in the transmission of the state information of the virtual machine capable of reproducing the state of the virtual machine at the given point in time.

According to a third aspect of an embodiment, in addition to the first solving means, the state information corresponding to the job processing is read from the storage module upon detection of abnormal completion of the job processing. Then, the distributed processing device creates restart job script information including the description of a procedure for expanding the read state information on software. Then, the distributed processing device transmits a file of the restart job script information to the job processing device.

According to a fourth aspect of an embodiment, in addition to the first solving means, the distributed processing device transmits to the job processing device state information storing, in software for executing the job processing, a job to be subjected to the job processing and input data of the job.

The present invention causes the virtual machine of the job processing device to execute the job processing, and acquires from the job processing device the virtual machine information capable of reproducing the state of the virtual machine at the given point in time. According to the present invention, therefore, the interim information during the job processing can be stored not by the job processing device. As a result, computational resources of the job processing device can be optimally used.

Hereinafter, in an embodiment of the present invention, a "job" is assumed to refer to the unit of work requested to a master machine 10 by a user, or a program on which a worker machine 20 actually executes processing. Further, in the present embodiment, a "job description" is assumed to refer to workflow information specifying a processing procedure necessary for the execution of the job. Furthermore, in the present embodiment, a "job script" is assumed to refer to a file including procedure information for the execution of the processing of the job by the worker machine 20.

FIG. 1 is a system configuration diagram of a batch system 1 in the present embodiment.

The batch system 1 is configured such that the master machine 10 (processing device) for managing (distributing) the processing of jobs and the worker machines 20 (job processing device) for executing the respective jobs are connected together by a network 30. The network 30 includes a LAN (Local Area Network), the Internet, and so forth. The batch system 1 of the present embodiment is configured such that one of machines thereof serves as the master machine 10 and assigns the jobs to the plurality of worker machines 20.

An overview of processes performed by the batch system 1 is as follows. The master machine 10 (a distributed processing device) receives a job description from a user of the batch system 1. The master machine 10 creates from the job description Virtual Machine (hereinafter referred to as VM) image data and a job script. The VM image data constitutes a file storing the state at a given point in time in which a virtual machine operates. The VM image data (continuation data) enables the virtual machine to continue execution of the job. The master machine 10 transmits the job description, the VM image data, and the job script to one of the worker machines 20.

The virtual machine (VM) is capable to perform the checkpointing and the restart by using a suspend function. For example, a product VMware produced by VMware Inc. can store the state of the OS and all processes in an image of a guest OS, if the system falls into a suspended state. The VMware can restart the execution of the processing by resuming the image stored in the guest OS.

In the checkpointing using VMware, however, the checkpoint restart cannot be performed in a common batch system. Therefore, the setting of the queuing, the use policy of computational resources of a worker machine (the queue setting), and so forth cannot be flexibly performed, and the setting of file transfer and so forth needs to be performed by a user. Further, there is no mechanism for writing a job for performing the checkpoint restart by using the batch system.

The worker machine 20 has a function of executing the virtual machine. The virtual machine is software for executing a computer which virtualizes such resources as a Central Processing Unit (CPU) and a storage module in the worker machine 20. Virtualization refers to a technique of causing recognition as if a plurality of hardware-like components constituting the worker machine 20 (e.g., the CPU, a memory, a hard disk, and a communication line) are configured to be different from the actual configuration of the worker machine 20. Through the expansion of the VM image data, the worker machine 20 can reproduce the virtual machine at the time of storage of the virtual machine in the VM image data. As the software for the virtual machine, VMware ESX Server (a registered trademark), Xen (a registered trademark), and so forth are provided.

The worker machine 20 executes the job on the virtual machine, and transmits the result of the processing of the job to the master machine 10.

Subsequently, the master machine 10 will be described. The following description is based on the assumption that the OS of the master machine 10 in the present embodiment is UNIX (a registered trademark) or Linux (a registered trademark). However, another OS such as Windows (a registered trademark) can also be easily implemented.

FIG. 2 is a functional block diagram of the master machine 10 in the present embodiment. The master machine 10 includes a job input module 11 and a batch management module 12.

The batch management module 12 assigns a job. ID (Identifier) to a job input from the job input module 11. Further, the batch management module 12 assigns the input job to an appropriate one of the worker machines 20, causes the worker machine 20 to execute the job processing, and collects the result of the job processing. Furthermore, when the batch management module 12 processes a plurality of jobs, the batch management module 12 stores the jobs received from the job input module 11 in a batch process management table 70.

The batch management module 12 includes an agent 16, a worker machine management table 50, and the batch process management table 70. The batch management module 12 has a function of receiving a job from the job input module 11, and selects the worker machine 20 for executing the processing of the received job.

The agent 16 transmits and receives a variety of information to and from the worker machine 20. The information transmitted to the worker machine 20 includes, for example, the VM image data, input file information, the job script, and so forth. Further, the information received from the worker machine 20 includes job completion information, checkpoint file data, and so forth.

The worker machine management table 50 is a table for managing the information of the processing capabilities of the respective worker machines 20. The worker machine management table 50 includes the information of the processing capabilities of the respective worker machines 20 connected to the batch system 1. The batch management module 12 acquires the information of the loads on the worker machines 20 at every predetermined time interval, and stores the information of the loads in the worker machine management table 50. In accordance with the state of the loads and the computing capabilities of the worker machines 20, for example, the batch management module 12 determines the worker machine 20 for executing the job.

The batch process management table 70 is a table for temporarily storing the job to be subjected to a batch process.

The job input module 11 is implemented in the master machine 10 as an additional function of the existing batch management module 12. The job input module 11 performs a process of detecting the job to be executed from the input job description 17, the management of the progress status of the job, and so forth.

The job input module 11 includes a VM image creation module 13, a job script creation module 14, a job management module 15, a VM image table 40, and a job state management table 60.

The VM image creation module 13 of the job input module 11 generates the data of the virtual machine to be executed by the worker machine 20.

The job script creation module 14 of the job input module 11 creates the job script. The job script includes a processing procedure of the job description provided to the worker machine 20. The job script is executed by a VM management module 22 of the worker machine 20. The job script is a program for causing the worker machine 20 to execute a function of expanding the VM image data of the worker machine 20 and activating the virtual machine, a function of transmitting the result of the job executed by the worker machine 20, a function of activating or stopping a guest OS 26 of the worker machine 20, a function of instructing a starter function 28 of the worker machine 20 to start the execution of the job description, a function of monitoring the starter function 28 of the worker machine 20, a function of writing the job description in a shared folder 29 by using a function of the guest OS 26, a function of transmitting a checkpoint of the worker machine 20, or the like.

The job management module 15 of the job input module 11 manages the execution state of the job processing executed in the worker machine 20. For example, the job management module 15 manages whether or not the batch management module 12 has input a job in the worker machine 20, whether or not the worker machine 20 is executing a job, whether or not the worker machine 20 has completed the job processing, whether or not the job processing has been abnormally completed in the worker machine 20, and so forth. The job management module 15 further manages the checkpoint file input therein. Further, upon detection of abnormal completion of the job processing, the job management module 15 instructs the job input module 11 to re-input the job.

The VM image table 40 is a table for storing template VM image data, the VM image data created for each job by the VM image creation module 13, and the checkpoint file received from the worker machine 20 for each checkpoint.

The job state management table 60 is a table for storing the information of the state of the job input in the worker machine 20. FIG. 3 is a configuration diagram of the job state management table 60 in the present embodiment.

Herein, the job state management table 60 will be described. The job state management table 60 includes, for each job, a record 65 constituted by job ID information 61, job name information 62, state information 63, checkpoint name information 64, and job script name information 66.

The job ID information 61 represents a number uniquely assigned to each job by the batch management module 12. The job name information 62 represents a job name registered by the job description 17 input by the user.

The state information 63 stores the current state of the job processing. For example, the state is divided into a "being processed" state indicating that the job is being executed in the worker machine 20, a "completed" state indicating that the job processing in the worker machine 20 has been completed and the result of the job processing has been acquired, and an "abnormally completed" state indicating that the job processing in the worker machine 20 has been abnormally completed.

The checkpoint name information 64 is file name information of the checkpoint corresponding to the job. The checkpoint file of the present embodiment includes the VM image data. The checkpoint file is assigned with a corresponding file name for each job and stored in the VM image table 40.

The job script name information 66 stores the file name of the job script file created by the job script creation module 14 in accordance with the job description 17. The job script file is stored in a storage module 104.

Figure 4:
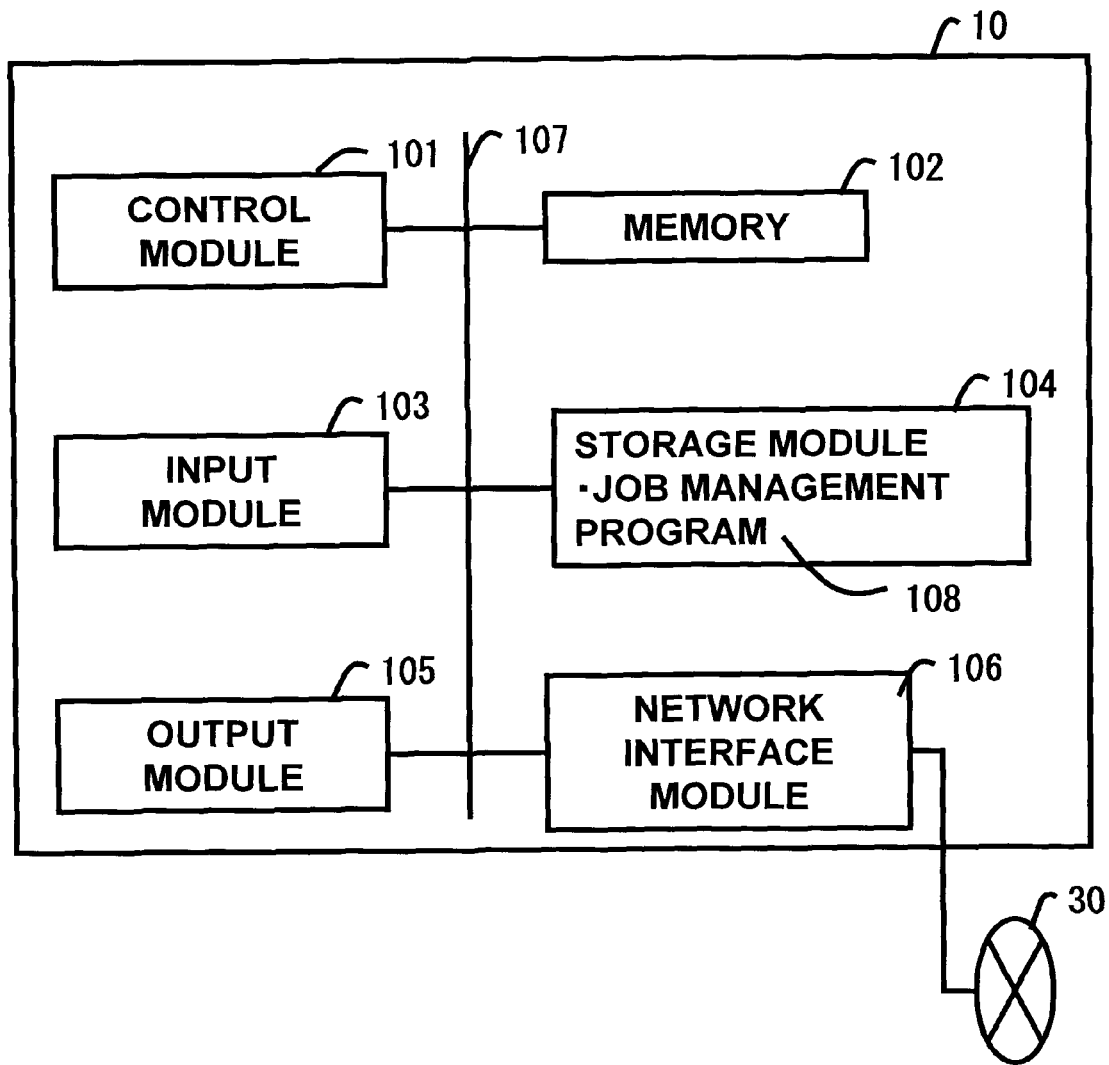
FIG. 4 illustrates a hardware configuration of the master machine in the present embodiment.

Subsequently, a hardware configuration of the master machine 10 will be described. FIG. 4 illustrates a hardware configuration of the master machine 10 in the present embodiment.

The master machine 10 is configured to include a control module 101, a memory 102, an input module 103, the storage module 104, an output module 105, and a network interface module 106, which are respectively connected to a bus 107.

The control module 101 controls the entirety of the master machine 10, and is constituted by a Central Processing module (CPU), for example. Further, the control module 101 executes a job management program 108 expanded in the memory 102. The job management program 108 causes the control module 101 to function as the job input module 11 and the batch management module 12.

The memory 102 is a storage area for expanding the job management program 108 stored in the storage module 104, and also is a storage area for storing a variety of operation results generated in the execution of the job management program 108 by the control module 101. The memory 102 is constituted by a Random Access Memory (RAM), for example.

The input module 103 receives the job description 17 from the user to be subjected to the job processing. The input module 103 is constituted by, for example, a keyboard, a mouse, a touch panel, and so forth. The job description 17 can also be input via the network 30. The output module 105 outputs the result of the job processing.

The output module 105 is constituted by, for example, a display device and so forth. The storage module 104 stores the job management program 108, the VM image table 40, the worker machine management table 50, the job state management table 60, and the batch process management table 70. The storage module 104 is constituted by a hard disk device, for example.

The network interface module 106 is connected to the network 30 to transmit and receive a variety of information to and from the worker machine 20.

Figure 5:
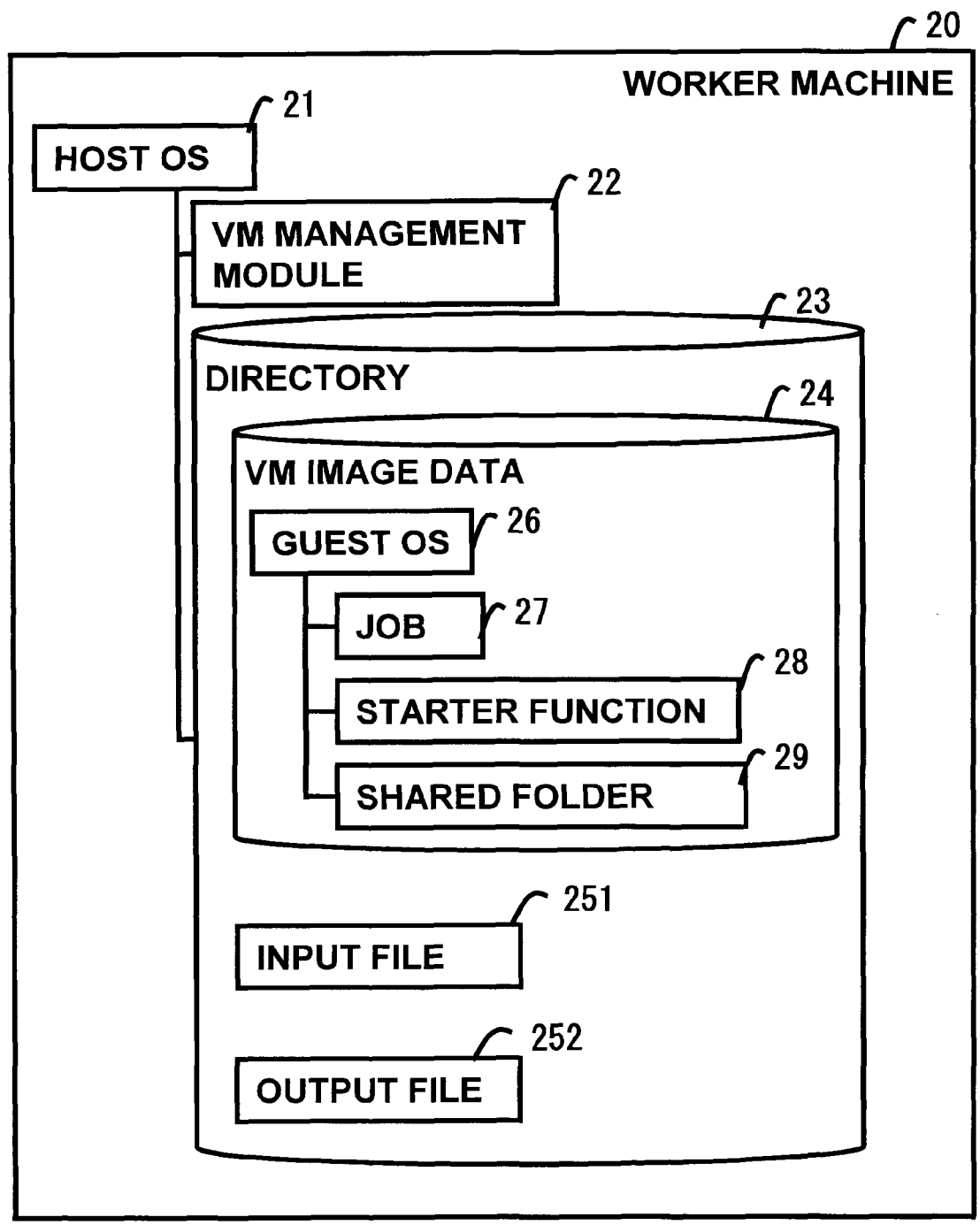
FIG. 5 is a functional block diagram of a worker machine in the present embodiment.

Subsequently, the worker machine 20 will be described. FIG. 5 is a functional block diagram of the worker machine 20 in the present embodiment. The worker machine 20 includes a host OS 21, which is software for managing the entirety of the worker machine 20.

The host OS 21 includes the VM management module 22 for managing the VM image data corresponding to the virtual machine. The VM management module 22 operates in accordance to the job script. Further, the VM management module 22 transmits and receives information to and from the master machine 10.

Further, host OS 21 includes a directory 23. The directory 23 is an area for storing files for processing the job. The worker machine 20 generates the directory 23 for each job. For example, the worker machine 20 stores a plurality of jobs in the respective plurality of directories 23 corresponding to the jobs. The directory 23 stores VM image data 24, input file information 251, and output file information 252. The input file information 251 stores, for example, variable information necessary for the execution of the job. The output file information 252 stores the information of the result of the processing of the job.

The virtual machine generated by the VM image data 24 includes the guest OS 26. The guest OS 26 includes a job 27, which is the job description to be executed, the starter function 28 for managing the job processing executed on the guest OS 26, and the shared folder 29 for transmitting and receiving data between the host OS 21 and the guest OS 26.

The host OS 21 handles the guest OS 26 through the VM image data 24. Further, the host OS 21 has a suspend function of suspending the guest OS 26. The suspend function of the present embodiment enables the storage of the state of the guest OS 26 at an arbitrary point in time, and the restart of the processing from the stored state in the next restart of the processing of the guest OS 26.

Herein, description will be made of the virtual machine executed in the worker machine 20 in the present embodiment. The virtual machine operating on the worker machine 20 has a suspend function and a resume function for storing the state information of the guest OS 26 of the virtual machine at a given point in time.

A virtual network of the guest OS 26 of the virtual machine in the present embodiment has the configuration of a host-only network 31 in which the guest OS 26 can access only to the host OS 21.

Figure 6:
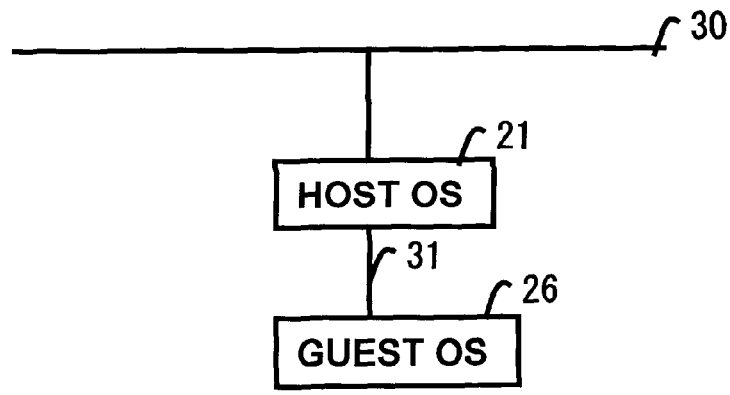
FIG. 6 is a conceptual diagram of a host-only network in the present embodiment.

FIG. 6 is a conceptual diagram of the host-only network 31 in the present embodiment. The host-only network 31 is configured as a special network in which only the host OS 21 and the guest OS 26 are connected to each other. That is, the host-only network 31 can prevent the shared folder 29 of the guest OS 26 from being shared by another machine connected to the network 30. As a result, the security of the guest OS 26 on the network is ensured, and the leakage of data relating to the job can be prevented. A configuration in which the guest OS 26 is connected to the network 30 is also possible.

Further, in the virtual network connecting the guest OS and the host OS 21 together, the connection is performed by an Internet Protocol (hereinafter referred to as IP), for example. The IP address of each of the guest OS and the host OS 21 is set to a fixed value. The IP address can be arbitrarily set to a private address not conflicting with an IP address existing in the network 30, to which the master machine 10 and the worker machine 20 belong.

Figure 7:
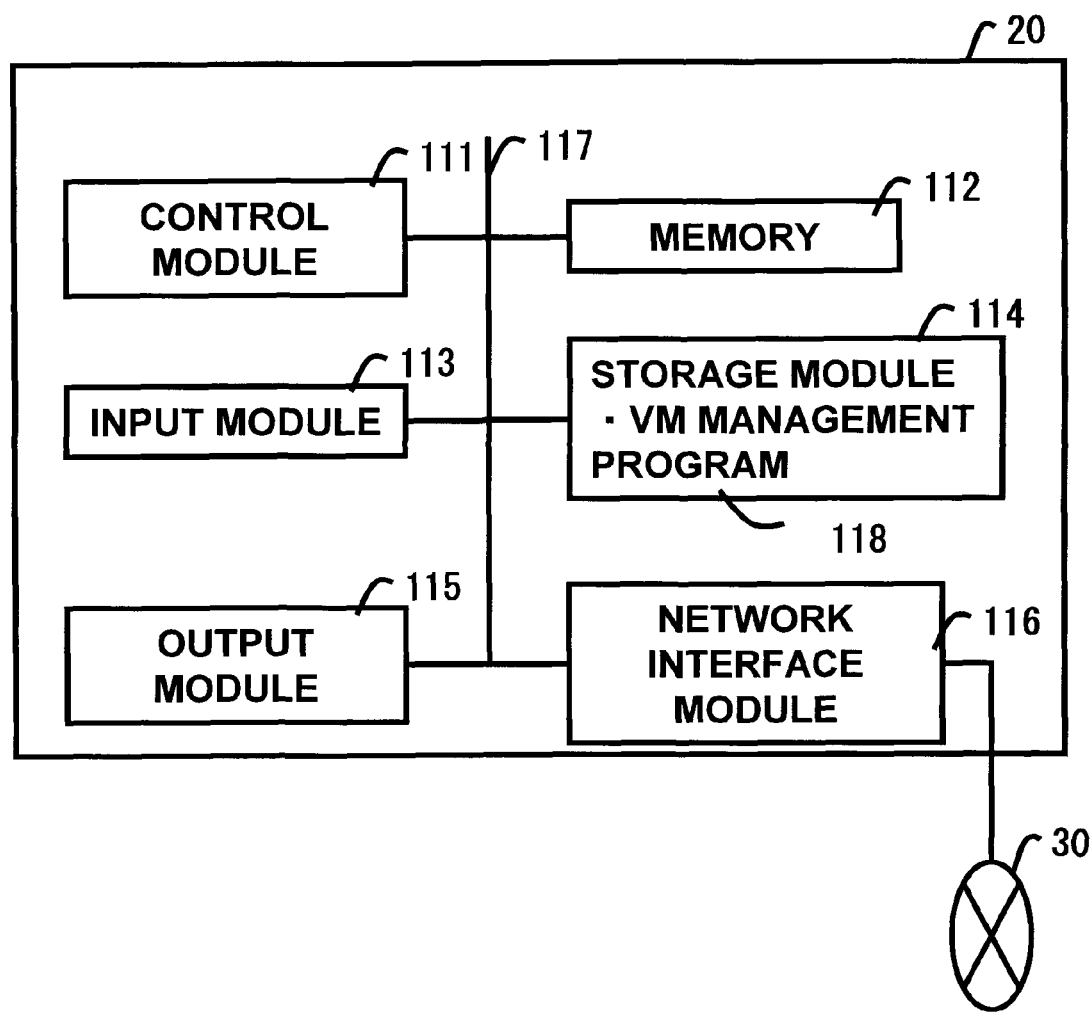
FIG. 7 illustrates a hardware configuration of the worker machine in the present embodiment.

Subsequently, a hardware configuration of the worker machine 20 will be described. FIG. 7 illustrates a hardware configuration of the worker machine 20 in the present embodiment. The worker machine 20 is configured to include a control module 111, a memory 112, an input module 113, a storage module 114, an output module 115, and a network interface module 116, which are respectively connected to a bus 117.

The control module 111 controls the entirety of the worker machine 20, and is constituted by a Central Processing Unit (CPU), for example. Further, the control module 111 executes a VM management program 118 expanded in the memory 112. The VM management program 118 causes the control module 111 to function as the VM management module 22. For simplification of explanation, the following explanation will describe that the control module 111 executes the program.

The memory 112 is a storage area for expanding the VM management program 118 stored in the storage module 114, and is a storage area for storing a variety of operation results generated in the execution of the VM management program 118 by the control module 111. The memory 112 is constituted by a Random Access Memory (RAM), for example.

The input module 113 receives the job description 17 from the user subjected to the job processing. The input module 113 is constituted by, for example, a keyboard, a mouse, a touch panel, and so forth. The output module 115 outputs the result of the job processing.

The output module 115 is constituted by, for example, a display device and so forth. The storage module 114 stores the VM management program 118 and the information of the directory 23. The storage module 114 is constituted by a hard disk device, for example.

The network interface module 116 is connected to the network 30 to transmit and receive a variety of information to and from the master machine 10.

Figure 8:
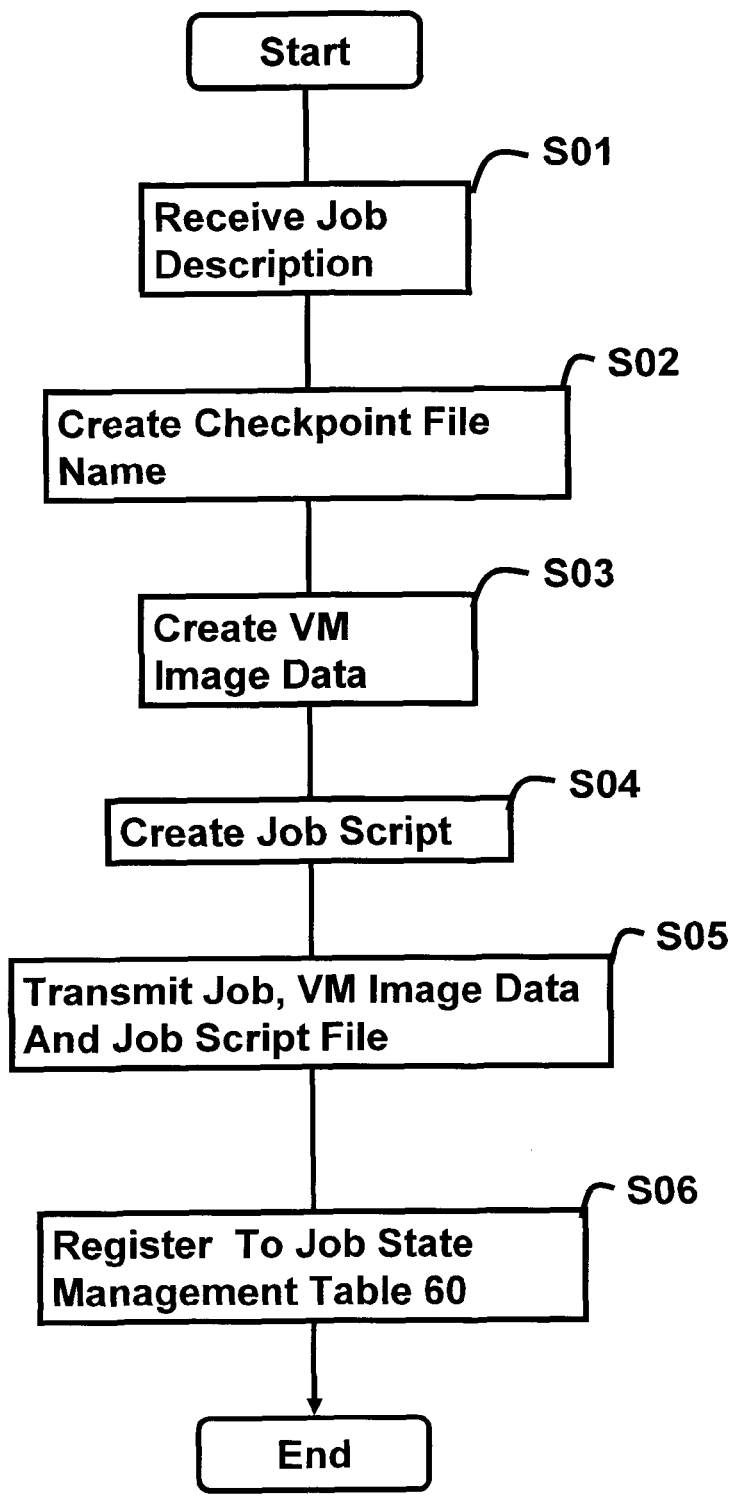
FIG. 8 is a flowchart of processes performed by a job input module in the present embodiment.

Subsequently, description will be made of processes performed by the master machine 10 when the job description is newly registered in the batch system 1 by the user. FIG. 8 is a flowchart of processes performed by the job input module 11 in the present embodiment. The job input module 11 receives the job description 17 as a job net provided by the user to the batch system 1 (Step S01). The job input module 11 creates from the job description 17 the checkpoint file name, the VM image data, and the job script (Steps S02, S03, and S04). Further, the job input module 11 inputs the job in the batch management module 12 (Step S05). Furthermore, the job input module 11 manages the processing state of the job (Step S06). The respective steps will be described in detail below.

The job input module 11 of the master machine 10 receives the job description 17 from the user (Step S01).

Figures 9, 13:
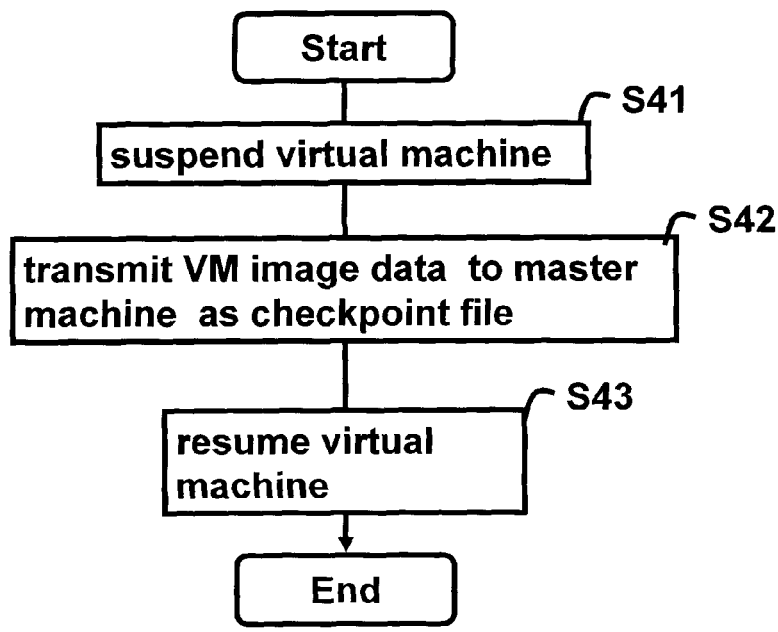
FIG. 9 illustrates an example of a job description in the present embodiment.
FIG. 13 is a flowchart of processes for creating and transmitting a checkpoint file in the present embodiment.

The job description 17 of the present embodiment stores a job description to be executed corresponding to the job 27 of the worker machine 20, input file information to be transmitted to the worker machine 20 before the start of the execution of the job processing, and output file information to be received from the worker machine 20 after the completion of the execution of the job processing. FIG. 9 illustrates an example of the job description 17 in the present embodiment. The job description 17 in the present embodiment is described by the user in the text format. The number appearing at the head of each line in FIG. 9 is the line number provided for explanation, and is not included in the job description. The fourth line of the job description 17 in FIG. 9 includes the description of a group of files transferred before the start of the execution of the job processing. The group of files transferred before the start of the execution of the job processing includes, for example, an input parameter and external function information. The fifth line of the job description 17 in FIG. 9 includes the description of a group of files transferred after the execution of the job processing. The plurality of files of the group included in the description are separated from one another by the comma character. The seventh line of the job description 17 in FIG. 9 includes the description of the job description to be executed. The job refers to the execution of processing in accordance with the job description to be executed. The job description to be executed can be described in a plurality of lines. The extraction of the information from the job description 17 in the text format is performed by an appropriate parsing device.

Then, the job input module 11 sets the name of the file for storing the checkpoint (Step S02). The checkpoint of the present embodiment is the VM image data storing the state of the virtual machine at a given point in time. The checkpoint is stored to store the state during the processing of the job and to enable the restart of the processing from the time of checkpointing if a data loss occurs during the processing of the job. The name of the file for storing the checkpoint is set to a name unique to each job managed by the job input module 11.

The job input module 11 creates the VM image data 24 from the job description 17 (Step S03). In the present embodiment, the master machine 10 and the worker machine 20 handle the virtual machine as one file. The VM image data 24 is installed with the guest OS 26. The guest OS 26 of the VM image data 24 is a common OS, such as Windows (a registered trademark), UNIX (a registered trademark), or Linux (a registered trademark), for example.

The guest OS 26 includes the shared folder 29 for allowing the guest OS 26 and the host OS 21 to share data. The shared folder 29 does not need to be shared by the master machine 10. The VM image data 24 has the starter function 28.

The starter function 28 is a program for causing the virtual machine of the worker machine 20 to execute the job processing. The starter function 28 detects the job 27, which is the job description to be executed stored in the shared folder 29 of the guest OS 26, and executes the job in accordance with the job 27. The starter function 28 has a function of transmitting and receiving information to and from the host OS 21 of the worker machine 20. The starter function 28 notifies the host OS 21 of the completion of the processing of the job. For example, the starter function 28 stores the output file information in the shared folder 29. If the shared folder 29 does not exist, a method in which the starter function 28 transmits and receives data to and from the VM management module 22 is possible.

The VM image data 24 is configured such that the starter function 28 of the guest OS 26 starts executing the job upon activation of the VM image data 24 in the worker machine 20. For example, the starter function 28 is registered as an automatically activated service when the OS is Windows (a registered trademark), and as an always executed daemon when the OS is UNIX (a registered trademark) or Linux (a registered trademark).

Figure 10:
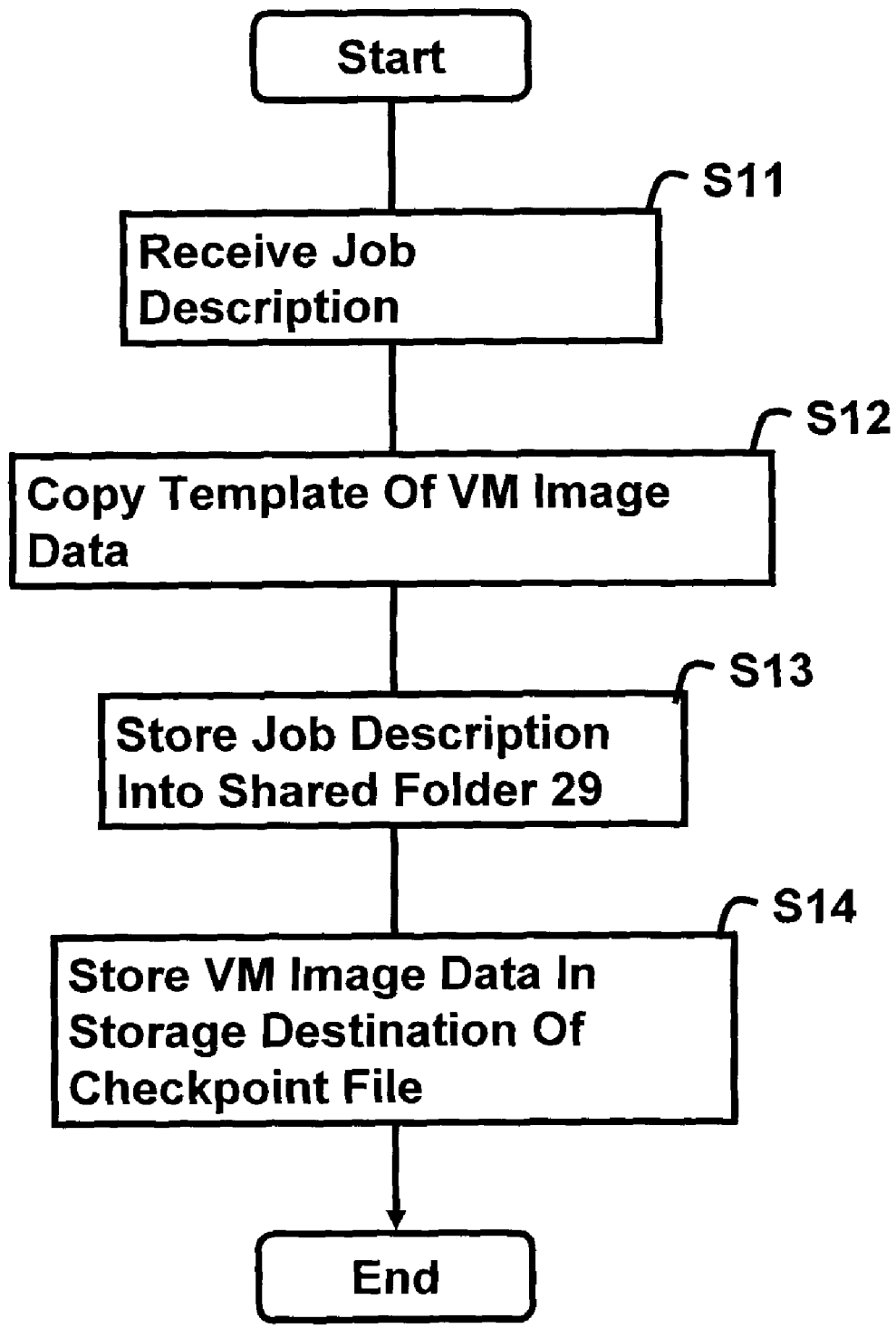
FIG. 10 is a flowchart of processes performed by the job input module to create VM image data in the present embodiment.

Herein, description will be made of the process at Step S03 in which the job input module 11 of the master machine 10 creates the VM image data 24. FIG. 10 is a flowchart of processes in which the job input module 11 creates the VM image data 24 in the present embodiment.

The job input module 11 receives the job description 17 (Step S11).

The job input module 11 copies the template VM image data of the VM image table 40 (Step S12). The copied VM image data is used to create the VM image data 24 expanded in the worker machine 20 in the subsequent processes.

The job input module 11 stores the job description to be executed included in the job description 17 into the shared folder 29 of the copied VM image data as the job 27 (Step S13). The job description to be executed is stored into the shared folder 29 with the use of a tool of the virtual machine.

The job input module 11 stores the created VM image data 24 in the storage destination of the checkpoint file (Step S14). This is for restarting the job processing by using the stored VM image data 24 in the event of future abnormal completion of the job processing before the acquisition of the checkpoint file from the worker machine 20.

The job input module 11 can also create the VM image data 24 according to another procedure. The template VM image data is assumed to be set such that the host OS 21 can share a file included in the shared folder 29 of the guest OS 26 in the VM image data 24. The job input module 11 stores the job 27 in the shared folder 29. In the worker machine 20, the starter function 28 of the guest OS 26 is set to execute the job 27 stored in the shared folder 29 upon receipt of an instruction from the host OS 21 for starting the execution of the job. Further, the starter function 28 is configured to, upon receipt of a plurality of instructions from the host OS 21 for starting the execution of the job, determine that only the first instruction is valid. The starter function 28 does not need to monitor the job 27 included in the shared folder 29.

Further, if the master machine 10 has a function of executing the virtual machine of the VM image data, the job input module 11 can create the VM image data 24 according to the following method.

The job input module 11 expands the VM image data 24 in the master machine 10, and writes the job 27 in the shared folder 29 by using a file sharing function of the guest OS 26 of the VM image data 24. Description will return to FIG. 8.

The job input module 11 creates the job script from the job description and the checkpoint (Step S04).

Figure 11:
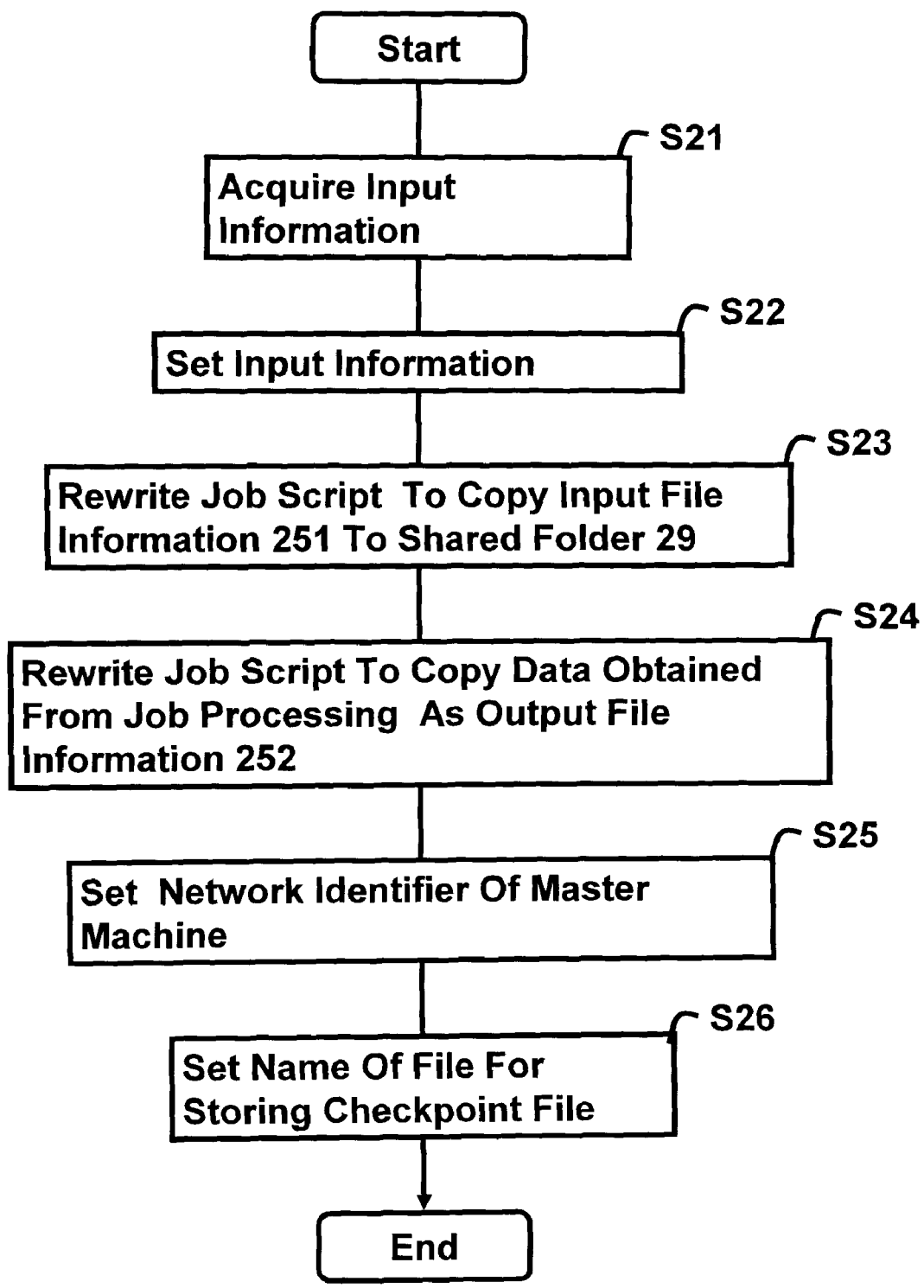
FIG. 11 is a flowchart of processes performed by a job script creation module in the present embodiment.

Herein, description will be made of the process at Step S04 in which the job input module 11 creates the job script. FIG. 11 is a flowchart of processes performed by the job script creation module 14 in the present embodiment.

The job input module 11 acquires the input information (Step S21). The input information includes the information of the job 27 and the storage destination of the checkpoint file.

The job input module 11 can create the job script by previously storing the data of a template job script and correcting the data of the template job script, and can newly create the job script for each job.

In the present embodiment, description will be made of a method of creating the job script by copying the data of the template job script and correcting the copied data of the template job script. The template job script has a function of instructing the starter function 28 to start the execution of the job processing.

The job input module 11 extracts from the job description 17 a portion for constituting the input file information 251. The job input module 11 sets the extracted description portion for constituting the input file information 251 in the input file information 251 to be transmitted to the worker machine 20 before the start of the execution of the job processing in the worker machine 20 (Step S22).

The job input module 11 rewrites the job script to copy the input file information 251 of the directory 23 to the shared folder 29 of the VM image data 24 (Step S23). The worker machine 20 executes the job script rewritten at Step S23. For example, the process at Step S23 of copying the input file information 251 is performed by a tool of the worker machine 20 for reading and writing the content of the VM image data 24. The copying process can also be performed with the use of the file sharing function of the guest OS 26. The starter function 28 and the VM management module 22 exchange information via the shared folder 29.

If the master machine 10 has the tool for reading and writing the content of the VM image data 24, the job input module 11 can previously store the input file information 251 in the shared folder 29 before inputting the information in the batch management module 12. The previous storage of the input file information 251 in the shared folder 29 of the VM image data 24 is advantageous in that the VM image data 24 constitutes the only file handed by the batch management module 12 and the worker machine 20.

The job input module 11 rewrites the job script of the process performed when the job processing is completed (Step S24). The worker 20 executes the process in accordance with the job script rewritten at Step S24. The job script rewritten at Step S24 is as follows, for example. Upon completion of the job processing, the worker machine 20 stores an output file obtained as the result of the job processing in the shared folder 29 of the VM image data 24. The copying process performed by the worker machine 20 is performed by a method using the tool capable of reading and writing the content of the VM image data 24 of the worker machine 20, a method using the file sharing function of the guest OS 26, or the like. The job input module 11 rewrites the job script such that the worker machine 20 executes a process of copying the result of the job processing from the output file of the shared folder 29 to the output file information 252 of the directory 23.

A network identifier of the master machine 10 is set (Step S25). This is for enabling communication between the job management module 15 and the worker machine 20. The network identifier is an IP address or a host name, for example, and constitutes information for identifying the master machine 10 on the batch system 1. The process of Step S25 can also be performed by updating the template of the job script not by performing the process in every creation of the job script.

The job input module 11 sets the name of the file for storing the checkpoint file set at Step S02 (Step S26). The VM management module 22 of the worker machine 20 transmits the checkpoint file to the master machine 10. This is because the master machine 10 needs to know the information of the location storing the received checkpoint file. According to the above-described processes, the job script is created. The job input module 11 stores the created job script file in the storage module 104, and stores the job script name information 66 in the job state management table 60.

The master machine 10 and the worker machine 20 can be configured to share the job state management table 60 by using the file sharing function. In this case, the VM management module 22 updates the state information 63 of the job processing in the shared job state management table 60.

The job management module 15 of the job input module 11 receives the state of the execution of the job processing transmitted by the job script executed in the worker machine 20.

Then, the job input module 11 transmits the job and the created VM image data and job script file to the batch management module 12 (Step S05).

The batch management module 12 causes the worker machine 20 to execute the job received from the job input module 11. The batch management module 12 can receive a file transmitted by the worker machine 20.

The batch management module 12 assigns a job ID to the job received from the job input module 11. The job ID is identification number information for identifying the target job. The batch management module 12 transmits the information of the assigned job ID to the job input module 11.

The job management module 15 of the job input module 11 acquires the job ID information from the batch management module 12, and acquires the job name information and the checkpoint file name information from the job input module 11. The job management module 15 registers the above sets of information in a new record 65 of the job state management table 60 as the job ID information 61, the job name information 62, and the checkpoint name information 64 (Step S06).

Meanwhile, by referring to the worker machine management table 50, the batch management module 12 determines the worker machine 20 for executing the processing of the job. The agent 16 transmits to the determined worker machine 20 the information necessary for the processing of the job. If the batch management module 12 inputs a new job in the worker machine 20, the job input module 11 stores the state information 63 in the job state management table 60 as the "being processed" state.

The batch management module 12 manages the batch process performed on the received job. According to the above-described processes, the batch management module 12 provides the job to the worker machine 20.

The batch management module 12 transmits to the worker machine 20 an instruction for transmitting to the master machine 10 the output file information 252 stored in the worker machine 20.

The batch management module 12 has a function of instructing the worker machine 20 to transfer the checkpoint file. If the batch management module 12 does not have the function of instructing the worker machine 20 to transfer the VM image data file, the worker machine 20 may be provided with a function of accessing the job input module 11 to enable the acquisition of the checkpoint file.

If the batch management module 12 of the master machine 10 does not have the function of receiving the checkpoint file from the worker machine 20, the job input module 11 can transfer the checkpoint file by using the existing file sharing function. The existing file sharing function is implemented by NFS (Network File System), rsync (remote file synchronization), ftp (file transfer protocol), rcp (remote copy), and so forth in the case of UNIX (a registered trademark).

The job management module 15 of the master machine 10 monitors the completion of the job input in the batch management module 12. The job management module 15 periodically checks the batch system 1 for the state of the jobs included in all the records 65 of the job state management table 60, and monitors the creation of the checkpoint. Upon detection of receipt of the checkpoint data from the VM management module 22, the job management module 15 updates the state information 63 of the job state management table 60.

When the jobs are completed, the job management module 15 completes the processing thereof, and deletes from the job state management table 60 the records 65, the job processing results of which have been acquired. The job input module 11 transmits the output file information 252 to the user as the result of the job processing.

As another configuration example, if the batch system 1 is configured such that the batch management module 12 transfers only the VM image data, the job management module 15 may receive the job script from the worker machine 20 in addition to the job ID and the storage destination of the checkpoint. Upon completion of the job processing, the job management module 15 may identify the output file information 252 described in the job script. Then, after the completion of the execution of the job processing, the job management module 15 may extract the output file information 252 from the checkpoint file acquired by the batch management module 12 from the worker machine 20.

Meanwhile, the job management module 15 determines that the job has been "abnormally completed" upon satisfaction of conditions that the job state management table 60 includes the checkpoint, that the state information 63 does not indicate the "completed" state, and that the batch management module 12 has no job. The job management module 15 checks the presence of the job ID information 61 of the job state management table 60 in the batch process management table 70 of the batch management module 12 as a job in execution. The presence of the job is periodically checked by the job management module 15 at preset time intervals, for example.

Upon detection of the abnormally completed job, the job management module 15 updates the state information 63 of the job state management table 60 to the "abnormally completed" state. If the job is abnormally completed, and if the checkpoint file is absent, the job management module 15 causes the job to be executed from the beginning.

Meanwhile, if the checkpoint file is present, the job management module 15 re-inputs the job. If the job is re-input, the batch management module 12 updates the job ID. The job management module 15 updates the job ID information 61 of the job state management table 60.

The job input module 11 creates a job script corresponding to a restart job. The job management module 15 transmits to the batch management module 12 a checkpoint file constituting a job for restarting the job processing.

The job management module 15 of the job input module 11 sets the job ID of the restart job as the target of monitoring. Upon acquisition of the result of the job processing, the job management module 15 completes the management of the job, the result of which has been acquired.

Subsequently, description will be made of processes performed by the worker machine 20.

The worker machine 20 performs the execution of the job processing, the transmission of the checkpoint file, and the notification of the job processing result. The VM management module 22 of the worker machine 20 performs the above-described processes in accordance with the job script acquired from the agent 16.

Figure 12:
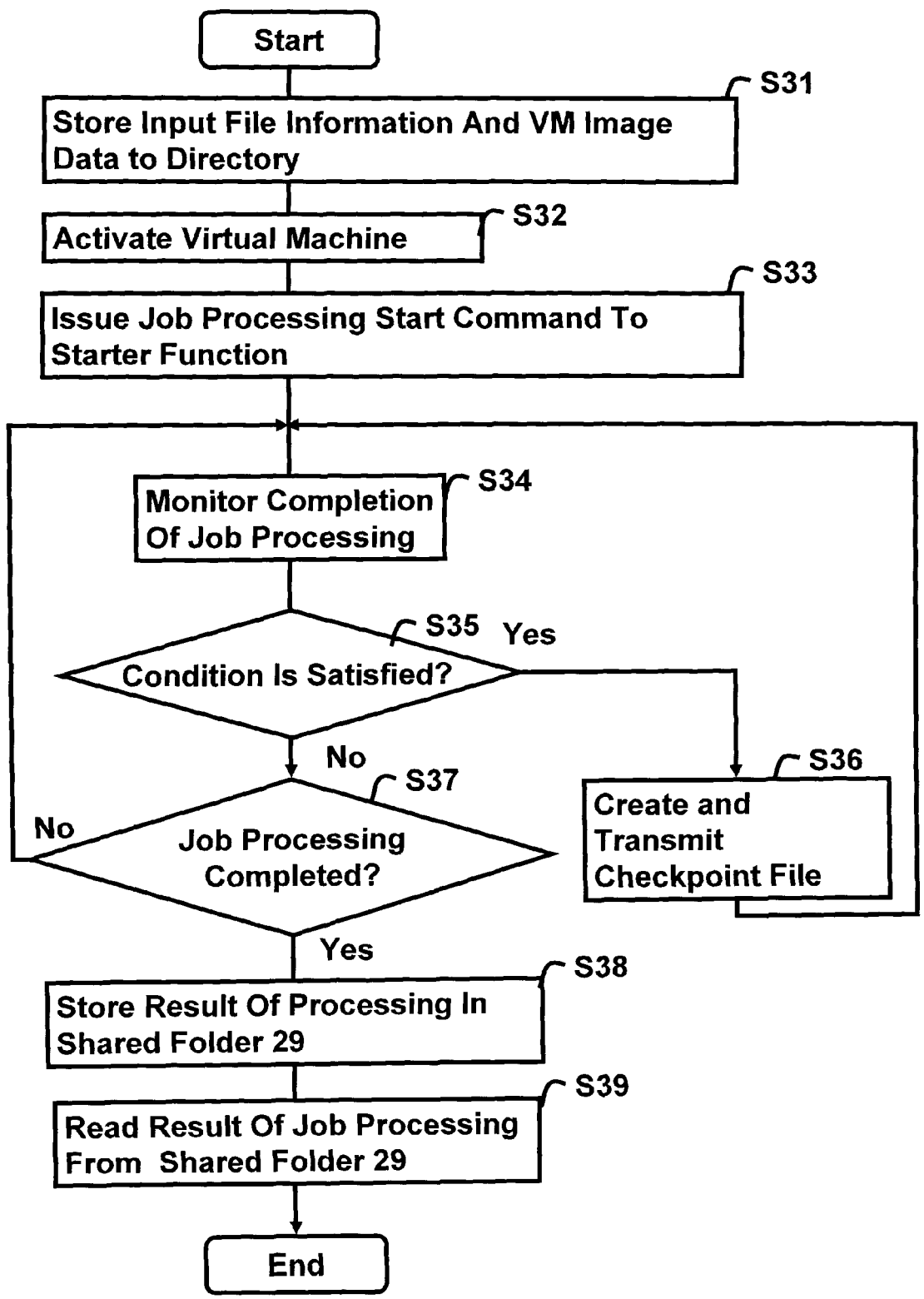
FIG. 12 is a flowchart of a job script operating on the worker machine in the present embodiment.

Herein, description will be made of the operation of the job script executed by the worker machine 20. FIG. 12 is a flowchart of the job script operating on the worker machine 20 in the present embodiment.

The VM management module 22 of the worker machine 20 stores in the directory 23 the input file information 251 and the VM image data 24 acquired from the agent 16 of the batch management module 12 of the master machine 10 (Step S31). The VM management module 22 activates the virtual machine from the VM image data 24 acquired from the agent 16 of the batch management module 12 of the master machine 10 (Step S32).

The VM management module 22 issues a job processing start command to the starter function 28 executed by the guest OS 26 included in the VM image data 24 (Step S33). The starter function 28 acquires the input file information 251 as the input information of the job, and starts the job processing. The starter function 28 is configured as a daemon, for example, and is activated simultaneously with the activation of the guest OS 26. The starter function 28 monitors a file generated as a result of the process of copying the job 27, and does nothing until the generation of the file. Upon detection of output of the file of the job 27, the starter function 28 starts the execution of the job processing.

The starter function 28 may be configured to automatically start the processing upon activation of the virtual machine, if the input file information 251 is present. Further, if the master machine 10 has previously written the input file information 251 in the shared folder 29 by using the tool for reading and writing the content of the VM image data 24, the starter function 28 does not require the process of copying the input file information 251 to the shared folder 29.

Upon issuance of the job processing start command, the starter function 28 monitors the completion of the job processing (Step S34). The starter function 28 monitors the execution process of the job processing executed on the guest OS 26. The starter function 28 transfers to the VM management module 22 the message of completion. One of the methods, the worker machine 20 generates to the shared folder a special output file indicative of completion of the job. The VM management module 22 of the worker machine 20 monitors the completion of the job processing by detecting the presence of the file of the output file information 252. The VM management module 22 monitors the completion of the job processing once every second, for example. Further, the VM management module 22 transfers the checkpoint once every hour, for example. The time interval of each of the monitoring of the completion of the job processing and the transfer of the checkpoint is appropriately changed in accordance with the environment of the batch system 1.

The VM management module 22 determines whether or not a condition for determining whether or not to transmit the checkpoint file is satisfied (Step S35). The condition is set to be satisfied upon lapse of a time preset in the worker machine 20, for example. The time is before completion of execution of the job. If the condition is satisfied (Yes at Step S35), the VM management module 22 performs a process of creating and transmitting the checkpoint file (Step S36).

Herein, description will be made of the process at Step S36 of creating and transmitting the checkpoint file. FIG. 13 is a flowchart of processes for creating and transmitting the checkpoint file in the present embodiment.

The VM management module 22 suspends the virtual machine. This is for stopping the operation of the virtual machine and acquiring the information enabling the reproduction of the state of the virtual machine at the current time (Step S41). The VM management module 22 transmits the VM image data 24 to the master machine 10 as the checkpoint file (Step S42).

The agent 16 of the master machine 10 acquires the checkpoint file, and notifies the job management module 15 of the job input module 11 of the arrival of the checkpoint file. The job management module 15 stores the checkpoint file in the VM image table 40, and changes the state information 63 of the job state management table 60 to the "being processed" state.

The VM management module 22 resumes the virtual machine (Step S43). Upon resumption, the virtual machine executes the remaining portion of the job processing after the time of suspension. Description will return to the flowchart of FIG. 12.

The starter function 28 determines whether or not the job processing has been completed (Step S37). The starter function 28 determines whether or not the job processing has been completed in accordance with the presence or absence of the execution process. If the job processing has not been completed (No at Step S37), the starter function 28 continues to monitor the completion of the job processing. Meanwhile, if the job processing has been completed (Yes at Step S37), the starter function 28 stores the result of the processing in the shared folder 29 (Step S38). If the execution process has run out, the starter function 28 stores the file of the result of the job processing in the output file information 252.

Upon detection of storage of the result of the job processing in the shared folder 29, the VM management module 22 reads the result of the job processing from the shared folder 29, and stores the result as the output file information 252 (Step S39). Then, The VM management module 22 ends the process. According to a conventional batch system, the host OS of the worker machine can detect the completion of the job. In the present embodiment, the guest OS 26 of the virtual machine executes the processing of the job. According to the VM management module 22 of the present embodiment, the host OS 21 cannot directly detect the completion of the job processing executed by the guest OS 26. Therefore, the starter function 28 stores the result of the job processing in the shared folder 29. The host OS 21 detects the compression of the process of the VM management module 22. For example, the host OS 21 can detect the result of the job processing stored in the shared folder 29. The VM management module 22 transmits to the master machine 10 the result of the job processing stored in the shared folder 29.

Further, the VM management module 22 transmits the result of the job processing to the agent 16 of the master machine 10. As another method, if the master machine 10 is capable of reading data from or writing data to the checkpoint file, the worker machine 20 can transmit the checkpoint file itself to the master machine 10. In this case, the amount of transferred data is increased, but the processing of the job script is simplified.

The agent 16 of the master machine 10 acquires the result of the job processing, and outputs the result to the user who has input the job description 17. The agent 16 notifies the job management module 15 of the job input module 11 of the completion of the job processing. The job management module 15 changes the state information 63 of the job state management table 60 to the "completed" state.

In the batch process, the job processing is abnormally completed in some cases, such as in the disconnection of power supply to the worker machine 20 and the occurrence of an error in the host OS 21 of the worker machine 20, for example.

In accordance with the following procedure, the job input module 11 determines the abnormal completion of the processing of the job input in the worker machine 20. The job input module 11 checks the result of the job processing in the batch process management table 70 of the batch management module 12 at every predetermined time interval. The job input module 11 determines that the job processing has been abnormally completed, if the result of the job processing in the batch process management table 70 is indicated as complete, and if the information of the result of the job processing has not been acquired from the worker machine 20 even after the lapse of a predetermined time since the result of the job processing in the batch process management table 70 had turned complete.

If the job input module 11 detects the abnormal completion of the job processing in the worker machine 20, the job input module 11 performs the process of re-inputting the job in the batch management module 12.

The job input module 11 reads the already created job script name information 66 from the record 65 of the job state management table 60 to be subjected to the job processing, and creates the job script for restarting the job processing.

The job input module 11 reads the VM image data from the VM image table 40. The VM image data to be read constitutes the latest checkpoint file corresponding to the abnormally completed job. Since the checkpoint has been stored, the remaining portion of the job processing can be executed in another worker machine 20 of the batch system 1.

The job input module 11 inputs in the batch management module 12 the job script for restarting the job processing.

Herein, description will be made of the job script for restarting the job processing.

Figure 14:
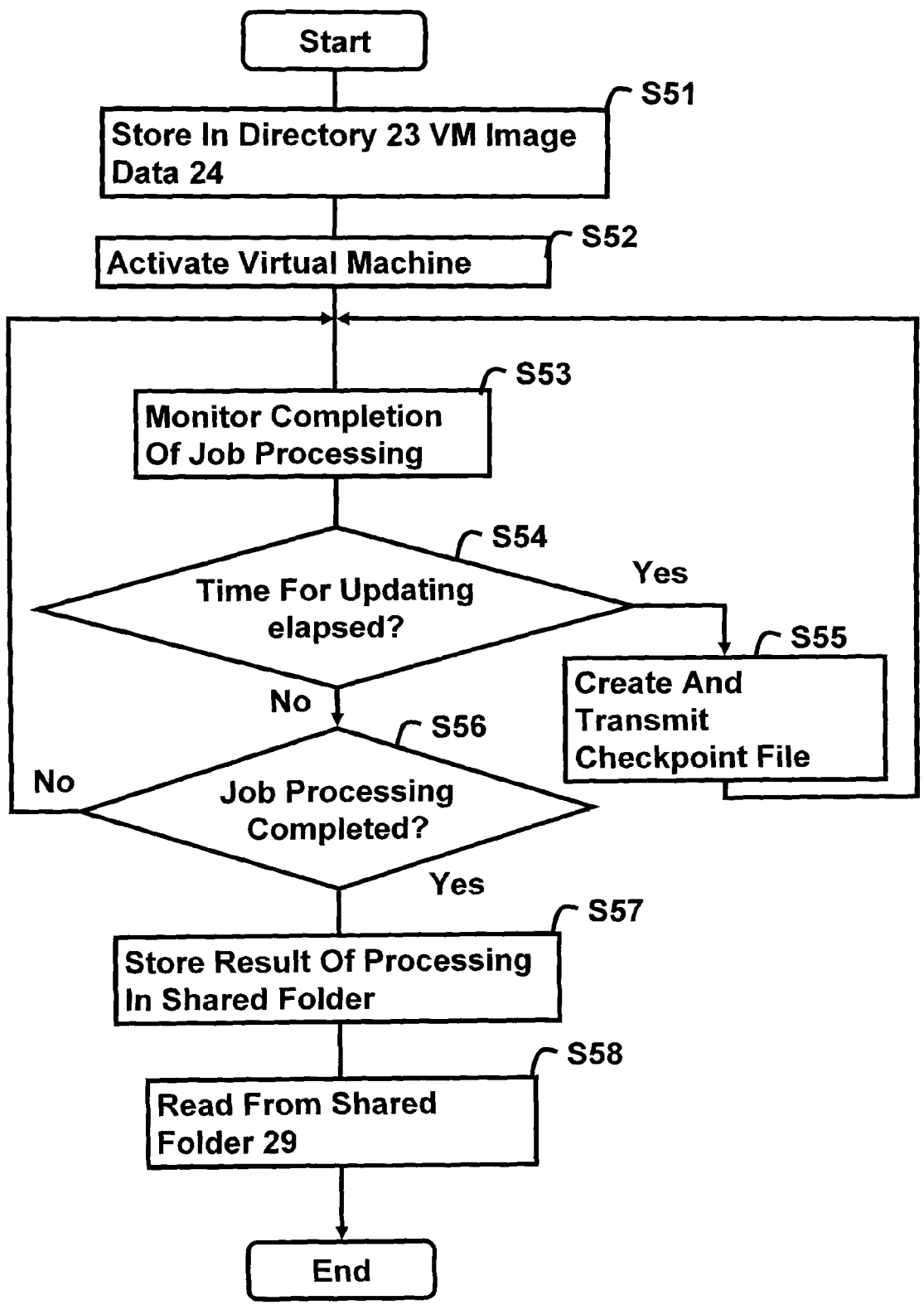
FIG. 14 is a flowchart of a job script operating on the worker machine in a restart of job processing in the present embodiment.

FIG. 14 is a flowchart of the job script operating on the worker machine 20 in the restart of the job processing in the present embodiment.

The VM management module 22 of the worker machine 20 stores in the directory 23 the VM image data 24 acquired from the agent 16 of the batch management module 12 of the master machine 10 (Step S51). The VM image data 24 acquired at Step S51 constitutes the checkpoint file stored in the VM image table 40. The job input module 11 reads the checkpoint file stored in the VM image table 40 corresponding to the checkpoint name information 64 of the job state management table 60. In the restart of the job processing, the execution of the job processing is started from an intermediate point of the processing. Therefore, the input file information 251 is unnecessary.

The VM management module 22 activates the virtual machine from the checkpoint file acquired from the agent 16 (Step S52). In this state, the starter function 28 of the activated virtual machine is starting the execution of the job processing. Since the starter function 28 is already executing the job processing, the process by the VM management module 22 of issuing the job processing start command to the starter function 28 is unnecessary.

The starter function 28 monitors the completion of the job processing (Step S53). The VM management module 22 determines whether or not the condition for the completion of the job processing is satisfied (Step S54). For example, the condition is set to be satisfied upon passing update timing.

If the condition is satisfied (Yes at Step S54), the VM management module 22 performs the process of creating and transmitting the checkpoint file (Step S55). The transmission process of Step S55 is similar to the process of FIG. 13.

The starter function 28 determines whether or not the job processing has been completed (Step S56). If the job processing has not been completed (No at Step S56), the starter function 28 continues to monitor the completion of the job processing. Meanwhile, if the job processing has been completed (Yes at Step S56), the starter function 28 stores the result of the processing in the shared folder 29 (Step S57).

Upon detection of storage of the result of the job processing in the shared folder 29, the VM management module 22 reads the result of the job processing from the shared folder 29, and stores the result as the output file information 252 (Step S58). The VM management module 22 can also transmit the result of the job processing to the agent 16 of the master machine 10.

According to the above-described processes, it is possible to detect the completion of the job executed in the virtual machine and to notify the batch system 1 of the detected completion of the job with the use of the suspend function and the resume function of the virtual machine.

In the present embodiment, the job script is created which enables the host OS 21 of the worker machine 20 to detect the completion of the job executed in the virtual machine. Thus, the completion of the job can be notified to the batch management module 12. Further, the present embodiment causes the virtual machine to execute the job, and thus is not limited by the type of the host OS 21 of the worker machine 20.

Further, the transmission and reception of the file information is performed between the VM management module 22 located on the host OS 21 of the worker machine 20 and the batch management module 12 of the master machine 10.

Therefore, the checkpointing and the restart can be performed in the batch system 1 or with an arbitrary OS or an arbitrary program.

Further, the file transfer is performed with the use of means included in the batch management module 12. Therefore, even in a case requiring the use of special file transfer means in a grid computing environment, file transfer unable to be performed by the function of the virtual machine and the function of the guest OS 26 (e.g., file transfer through a firewall) can be performed.

As another configuration example, the template data of the VM image data can be previously stored in the worker machine 20. In this configuration, the master machine 10 transmits the job script and the input file information to the worker machine 20, and the job script executes the job processing on the basis of the VM image data included in the worker machine 20. Further, the worker machine 20 transmits the checkpoint file for each checkpoint to the master machine 10. With this configuration, the master machine 10 does not need to transmit the first VM image data. As a result, the effect of reducing the amount of data required for communication is obtained.

As still another configuration example, the batch management module 12 of the master machine 10 may not have the function of transferring a file from the worker machine 20. In this case, the job input module 11 of the master machine 10 can acquire the checkpoint file of the worker machine 20. Further, if the batch management module 12 of the master machine 10 does not have the function of transferring a file from the worker machine 20, the job input module 11 may notify the worker machine 20 of the information for starting the job.

Further, if the batch management module 12 of the master machine 10 does not have the function of transferring a file from the worker machine 20, the job management module 15 of the job input module 11 may be configured to acquire the checkpoint file from the worker machine 20 and transmit the checkpoint file to the batch management module 12.

As still yet another configuration example, when the file transfer function of the batch management module 12 is used, only the VM image data can be transferred to the worker machine 20. Since a single file corresponds to one job, the management performed by the batch management module 12 is simplified.

To transfer only the VM image data, the job input module 11 performs the following processes. The job input module 11 specifies the VM image data 24 as the file to be transferred before the execution of the job processing in the worker machine 20. Further, the job input module 11 specifies the VM image data 24 as the file to be received from the worker machine 20 as the result of the execution of the job processing. The job script in this case omits the step of copying the input file information 251 to be transferred before the start of the execution of the job processing and the step of copying the output file information 252 to be transferred after the completion of the job processing.

What is claimed is:

1. A method for controlling a system including a first computer and a second computer for executing a job and a third computer for distributing the job to the first computer and the second computer, the method comprising:
generating, by the third computer, job script data;
generating, by the first computer, VM (Virtual Machine) image data for processing VM for executing the job before completion of execution of the job, the VM image data including state information of the VM at a given internal time, the VM including a starter function for monitoring a completion of job processing;
transmitting the generated VM image data from the first computer to the third computer;
transmitting the VM image data and job script data regarding the job from the third computer to the second computer when the second computer takes over the job;
receiving, by the second computer, the VM image data and the job script data from the third computer;
resuming, by the second computer, the job based on the VM image data and the job script data;
detecting, by the first computer, a completion of the job executed in the VM on the basis of the starter function; and
notifying, by the first computer, a batch system of the completion of the job.

2. The method according to claim 1,
wherein the transmitting the VM image data and job script data transmits the VM image data and the job script regarding the job from the third computer to the second computer upon detecting abnormal completion of the job by the first computer.

3. A system comprising:
a first computer and a second computer for executing a job; and
a third computer for distributing the job to the first computer and the second computer,
wherein the third computer generates job script data;
wherein the first computer generates VM (Virtual Machine) image data for processing VM for executing the job before completion of execution of the job; the VM image data including state information of the VM at a given internal time, the VM including a starter function for monitoring a completion of job processing;
wherein the first computer transmits the generated VM image data to the third computer;
wherein the third computer transmits the VM image data and job script data regarding the job to the second computer when the second computer takes over the job;
wherein the second computer receives the VM image data and the job script data from the third computer;
wherein the second computer resumes the job based on the VM image data and the job script data; and
wherein the first computer detects a completion of the job executed in the VM on the basis of the starter function, and notifies a batch system of the completion of the job.

4. The system according to claim 3, wherein one of the first computer and the second computer executes the job by a virtual machine of the one of the first computer and the second computer.

5. The system according to claim 4 wherein the virtual machine has a common directory capable of accessing from the first computer and the second computer, wherein the one of the first computer and the second computer transmits completion information of the job to said common directory.

* * * * *